J. R. DODGE, Jr. & W. G. MAST.
Corn-Planter.
No. 198,874. Patented Jan. 1, 1878.
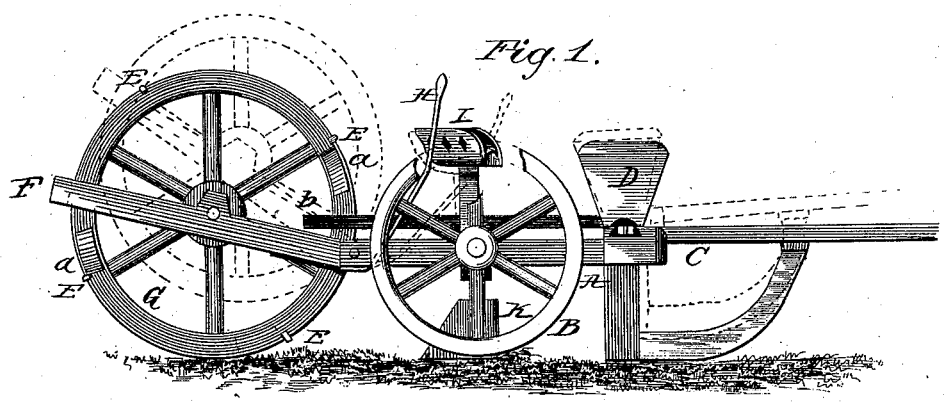
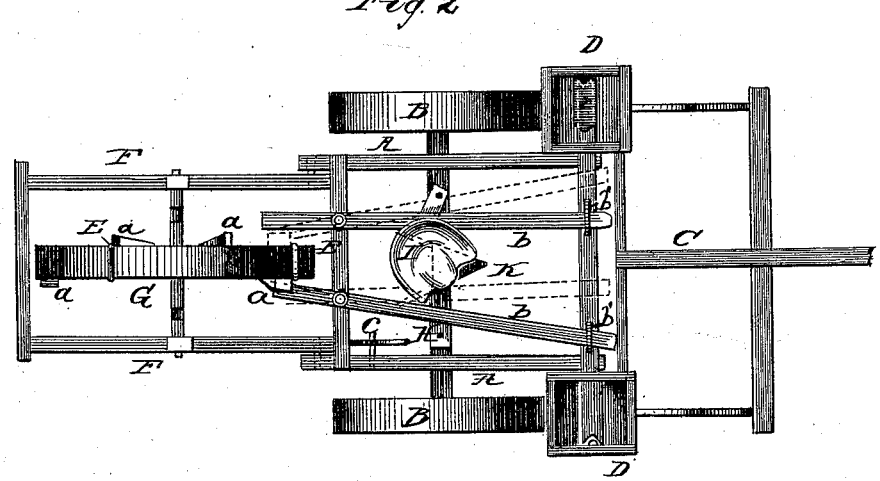
Witnesses.
Fred G. Dieterich
Augustus Watson.
Inventors
John R. Dodge Jr
William G. Mast,
by
DeWitt C. Allen
atty

UNITED STATES PATENT OFFICE.

JOHN R. DODGE, JR., AND WILLIAM G. MAST, OF NORMAL, ILLINOIS.

IMPROVEMENT IN CORN-PLANTERS.

Specification forming part of Letters Patent No. 198,874, dated January 1, 1878; application filed August 20, 1877.

*To all whom it may concern:*

Be it known that we, JOHN R. DODGE, Jr., and WILLIAM G. MAST, of Normal, in the county of McLean and State of Illinois, have invented certain new and useful Improvements in Corn-Planters; and we do hereby declare that the following is a full, clear, and exact description of the same, reference being made to the accompanying drawings, forming a part of this specification, and in which—

Figure 1 is a side view of our improved planter, and Fig. 2 a top or plan view of the same.

This invention relates to improvements in the class of corn-planters in which check-rowers are dispensed with; and the invention consists in the combination and arrangement of parts, as will be hereinafter fully described.

In the drawings, A represents the main frame, supported upon the wheels B B. C represents a front frame, hinged to the main frame A, and D D represent the seed-boxes. F represents a rear frame, hinged to the rear of frame A, and which is supported by the ground-wheel G, which is arranged directly in rear of the driver's seat. The outer rim of this ground-wheel is provided on each side with two or more cams, $a$, which are arranged to alternate with each other, and to operate the pivoted arms $b\ b$, to which the seed-slide is secured by the hasps $b'\ b'$, the said arms being adapted to move freely within the hasps in raising and lowering the front frame, and said arms are alternately operated as the ground-wheel revolves, thus alternately dropping the corn from the boxes D D.

E represents a series of heavy wires or bands, which pass across the outer surface or tire of the ground-wheel, said wires or bands being arranged at a point opposite the thickest portion of the cams E; and these wires or bands are designed to mark the ground so as to correspond with the rows planted. The corn is dropped on a line with said marked places. The above-described manner of securing the markers to the wheel prevents them from being easily broken off by coming in contact with any hard substance in passing over the ground.

The rear or ground wheel and its frame are elevated, when it is desired to turn the planter around, by means of a bent lever, H, arranged at the right or left of the driver's seat I, and which, when pressed forward, raises the rear frame, with its wheel, from the ground, and which is held in any desired position by a ratchet or pin, $c$, engaging with said lever, as shown in Fig. 2.

It will be observed that by raising the rear frame with its wheel, the weight is sufficient to raise the frame C, as clearly shown by dotted lines in Fig. 1, and the operator or driver, sitting on the seat secured centrally to the axle of the supporting-wheels B B, can, by leaning forward or backward, balance the front and rear frames, so as to raise them both from the ground, and leave the two wheels of the main frame to turn the planter around.

K is an angular scraper, secured to the axle under the driver's seat, and is designed to clear away trash, and clots and lumps of dirt, so that the ground or marking wheel will work smoothly and well, it being very important that it should do so, as the dropping of the corn depends entirely upon the regularity of the marking-wheel.

We do not desire to be limited to any particular kind of lever for raising the ground-wheel and frame, nor to any particular fastening device to hold the lever in place when said frame and wheel are raised.

Nor do we desire to be limited to the angular scraper for cleaning away the trash, &c., from front of the marking or ground wheel, as any device for accomplishing said object could be substituted therefor. We prefer a scraper, however, similar to a plow-point, which will work easier. Said scraper can be raised or lowered by any desired device, which is very desirable, when passing along the road, to raise it from the ground, so as not to encounter any obstructions.

In using our improved planter, both sides of the field should be marked, so that the planter can be started at each side on said line, which answers the purpose of a starting-guide.

We claim as our invention—

1. The combination of the front frame C, having seed-boxes D, and seed-slide, provided with hasps $b'\ b'$, main frame A, having pivoted arms *b b*, rear frame F, and ground-wheel G, provided with cams *a*, substantially as and for the purpose specified.

2. The ground-wheel G, having heavy wires or bands E arranged across the outer surface or tire of the wheel, substantially as and for the purpose herein shown and described.

3. The combination, with the main frame A, supported on wheels B, and having the driver's seat centrally located upon the axle, of the frames C F, hinged or pivoted, respectively, to the front and rear of frame A, whereby raising the rear frame will raise and balance the front frame, independent of any auxiliary mechanism, substantially as herein shown and described.

4. The combination of the main frame, having driver's seat, pivoted arms *b b*, pivoted lever H, stop *c*, and adjustable scraper K, the pivoted front frame C, having seed-boxes and slide, and the pivoted rear frame F, having ground-wheel G, provided with cams *a*, the several parts constructed and relatively arranged to operate substantially as herein shown and described.

In witness whereof we have hereto set our hands this 13th day of August, 1877.

JOHN R. DODGE, Jr.
WILLIAM G. MAST.

Witnesses:
THOS. SLADE,
R. A. PIKE.